United States Patent [19]
Cottis et al.

[11] Patent Number: 5,262,473
[45] Date of Patent: Nov. 16, 1993

[54] POLYMER MOLDING COMPOSITIONS CONTAINING POLYCARBONATES AND POLYESTERS AND LIQUID CRYSTALLINE POLYMERS

[75] Inventors: Steve Cottis, Hightstown; Hui Chin, North Brunswick; Wen-Hann Shiau, Monmouth Junction; David Shopland, Dumont, all of N.J.

[73] Assignee: Enichem America Inc., Monmouth Junction, N.J.

[21] Appl. No.: 800,411

[22] Filed: Nov. 29, 1991

[51] Int. Cl.$^5$ .................. C08L 69/00; C08L 67/03
[52] U.S. Cl. .................. 524/537; 525/439; 525/466
[58] Field of Search .................. 524/537; 525/439, 466

[56] References Cited

U.S. PATENT DOCUMENTS

| | | | |
|---|---|---|---|
| 4,161,470 | 7/1979 | Calundann | 524/599 |
| 4,228,218 | 10/1980 | Takayanagi et al. | 525/58 |
| 4,267,289 | 5/1981 | Froix | 525/444 |
| 4,276,397 | 6/1981 | Froix | 525/448 |
| 4,330,457 | 5/1982 | East et al. | 524/602 |
| 4,386,174 | 5/1983 | Cogswell et al. | 524/27 |
| 4,408,022 | 10/1983 | Cincotta et al. | 525/444 |
| 4,433,083 | 2/1984 | Cogswell et al. | 524/27 |
| 4,438,236 | 3/1984 | Cogswell et al. | 525/165 |
| 4,439,578 | 3/1984 | Kim et al. | 524/538 |
| 4,460,735 | 7/1984 | Froix | 524/537 |
| 4,460,736 | 7/1984 | Froix et al. | 524/539 |
| 4,460,738 | 7/1984 | Frentzel et al. | 524/591 |
| 4,489,190 | 12/1984 | Froix | 524/539 |
| 4,563,508 | 1/1986 | Cottis et al. | 525/444 |
| 4,567,227 | 1/1986 | Kiss | 524/538 |
| 4,639,504 | 1/1987 | Cottis | 528/176 |
| 4,728,698 | 3/1988 | Isayev et al. | 525/439 |
| 4,833,229 | 5/1989 | Magagnini et al. | 528/193 |
| 4,841,009 | 6/1989 | Kelsey | 528/75 |
| 4,871,817 | 10/1989 | Rock | 525/425 |
| 4,904,757 | 2/1990 | Coassolo et al. | 528/272 |
| 4,970,285 | 11/1990 | Pedretti et al. | 528/193 |
| 5,039,773 | 8/1991 | Sacripante et al. | 528/176 |
| 5,084,549 | 1/1992 | Pierlartzik et al. | 528/176 |
| 5,089,590 | 2/1992 | Pierlartzik et al. | 528/176 |

FOREIGN PATENT DOCUMENTS 0265791 of 0000 European Pat. Off. .

OTHER PUBLICATIONS

*Polymer Engineering and Science,* (1987), 27, pp. 410-423, "In Situ Composites: Blends of Isotropic Polymers and Thermotropic Liquid . . . ", Kiss.

*Primary Examiner*—Paul R. Michl
*Assistant Examiner*—John J. Guarriello
*Attorney, Agent, or Firm*—Oblon, Spivak, McClelland, Maier & Neustadt

[57] ABSTRACT

A polymer composition containing a thermotropic liquid crystal polymer, polycarbonate and polyester. The polymer compositions are prepared by a two-step melt processing method which produces a unique microscopic morphology and improved toughness properties over conventional LCP blends.

25 Claims, 6 Drawing Sheets

POLYMER MOLDING COMPOSITIONS CONTAINING POLYCARBONATES AND POLYESTERS AND LIQUID CRYSTALLINE POLYMERS

BACKGROUND OF THE INVENTION

1. Field of the Invention

The invention relates to thermoplastic molding compositions containing a thermotropic liquid crystal (crystalline) polymer, polycarbonate and polyester. The polymeric composition exhibits improved ductility and toughness properties, such as impact strength and elongation at break over conventional LCP blends. These compositions also show normal mold shrinkages.

2. Discussion of the Background

In general, the properties of a polymeric molding composition depend on the properties of the specific polymers contained in the composition. Many known polymeric compositions have been formulated to take advantage of specific properties and combinations of properties which are achieved by combining together specific polymeric materials.

Fibers are conventionally added to polymer composites to provide fiber-reinforced products. Conventionally, glass fibers, carbon fibers and high-strength organic polymer fibers, such as aromatic polyamide fibers, have been added to polymer compositions to provide improved impact strength and tensile strength. More recently, liquid crystal polymers (LCPs) have been added to polymeric molding compositions to improve the flexural strength of polymer compositions. Conventionally, the components of polymer composition including the LCP are mixed and compounded together followed by extrusion.

Polymer blends containing wholly aromatic liquid crystalline polyesters and a second polymer forming a binary blend are well known in the art. The use of aromatic polyesters which are capable of forming an anisotropic melt phase produces injection molded articles which exhibit good tensile strength, tensile modulus, flexural strength and flexural modulus which exceeds that of the non-LCP polymeric components considered separately.

Examples include U.S. Pat. No. 4,267,289 which discloses binary blends of two aromatic polyesters forming an anisotropic melt phase. U.S. Pat. No. 4,276,397 and U.S. Pat. No. 4,460,736 teach binary mixtures of a polyarylene sulfide with a polyester forming an anisotropic melt phase. U.S. Pat. No. 4,489,190 and U.S. Pat. No. 4,408,022 disclose binary polymer blends containing a polyalkylene terephthalate with polyesters. U.S. Pat. No. 4,460,738 and EP 0 265 791 teach blends of polycarbonate with polyester. U.S. Pat. No. 4,567,227 teaches blends of poly(ester-amide) with polyester and U.S. Pat. No. 4,871,817 discloses blends of poly(ether-imide) with LCPs, including polyesters. U.S. Pat. No. 4,970,285 and U.S. Pat. No. 4,833,229 teach thermotropic copolyester LCPs and their binary mixtures with polycarbonate, PET or PBT. U.S 4,841,009 discloses substantially linear monomeric compositions and liquid crystal polymer compositions.

EP 0 587 732 discloses polymer molding compositions which are fiber-reinforced with reinforcing fibers of a liquid crystalline polymer in a matrix of polyethylene terephthalate (PET), polybutylene terephthalate (PBT), polycarbonate or an unsaturated polyester resin. Additional composites are disclosed in G. Kiss, Polymer Science and Engineering, 27 (6), 410–423 (1987), which teaches blending thermotropic LCPs with amorphous or crystalline polymers. The melt viscosities of these blends are reduced over those of polymers not containing the LCP. The substantial increase in tensile strength demonstrated by these fiber-reinforced blends is offset by a drastic reduction in the elongation at break properties. The addition of increasing amounts of LCP as a reinforcing agent increases tensile and flexural modulus and strength but greatly reduces the elongation at break and embrittles the material.

U.S. Pat. No. 4,439,578 discloses the use of high aspect ratio LCP particles in thermoplastic molding compositions for the purpose of enhancing resistance to melt dripping.

U.S. Pat. No. 4,228,218 discloses the reinforcement of a polymer by incorporating 20% or less of a polymer having a rigid rod shape. The rigid reinforcing polymer is uniformly dispersed in a matrix resin and has a particle size of 50 Å or more. The method of dispersion of the rigid rod polymer in the matrix resin leaves the rigid rod in a state in which it imparts reinforcement to the matrix resin, functioning in a manner similar to reinforcing glass fibers. The reinforced polymers are prepared, for example, by casting films or fibers out of solution. These processes produce shearing forces which cause the rigid rod polymers to line up producing an anisotropic product with the desired reinforcement properties. Since these small rigid rod polymers are not subjected to temperatures and shear rates which would cause them to agglomerate, the rigid rod polymers remain as small rigid rods, acting as an inert filler reinforcing agent. These anisotropic reinforced polymers exhibit good tensile strength, but inadequate ductility and toughness properties.

A ternary polymeric molding composition is described in U.S. Pat. No. 5,011,884. These molding compositions contain 20-70 wt. % of a thermotropic liquid-crystalline polymer, 10-50 wt. % of a polycarbonate and 10-50 wt. % of a polyester. These materials exhibit high flexural strength and a low thermal expansion coefficient, but inadequate ductility and toughness properties. The three components are simultaneously blended to give the desired molding composition.

A need continues to exist for polymeric molding compositions containing liquid crystal polymers having improved properties. In particular, a need exists for LCP containing compositions which have increased toughness and ductility without significant loss of other desirable physical properties such as tensile and flexural modulus and heat deflection temperature.

SUMMARY OF THE INVENTION

One object of the present invention is to provide a polymer blend composition containing liquid crystal polymers which demonstrates improved ductility and toughness properties.

A further object is to provide a liquid crystal polymer containing molding composition which has not only improved toughness properties but also improved tensile and flexural strength, heat deflection temperature and flexural modulus properties over the corresponding binary blends without LCP present.

These and other objects which will become apparent from the following specification have been achieved by the present polymer composition and the method of preparing the same. The polymeric molding composition of the present invention comprises polycarbonate, polyester and thermotropic liquid crystal polymers, further having a unique polymer morphology where the surface morphology of extruded or injection molded solid objects contains substantially no LCP fibrils and where the core of the polymer article contains LCP droplets having a low aspect ratio.

These novel molding compositions are prepared by first blending two of the components together followed by extruding this preblend with the third component, under melt mixing conditions favoring the LCP entering the nematic phase, to form pellets. The melt mixed blend is a ternary blend having improved elongation at break and impact strength.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
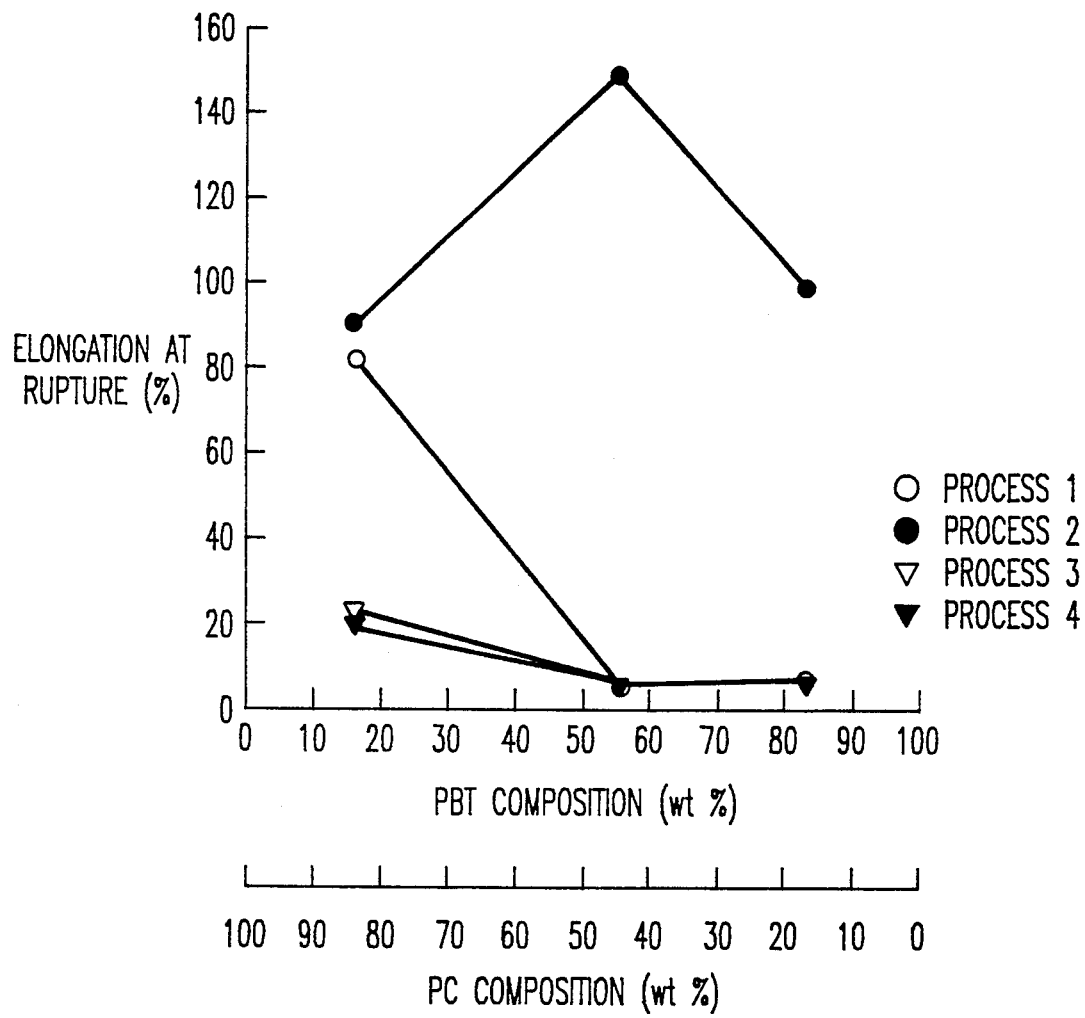
FIG. 1 shows elongation at rupture properties of PBT/PC/LCP blends for varying PBT and PC composition.
Figure 2:
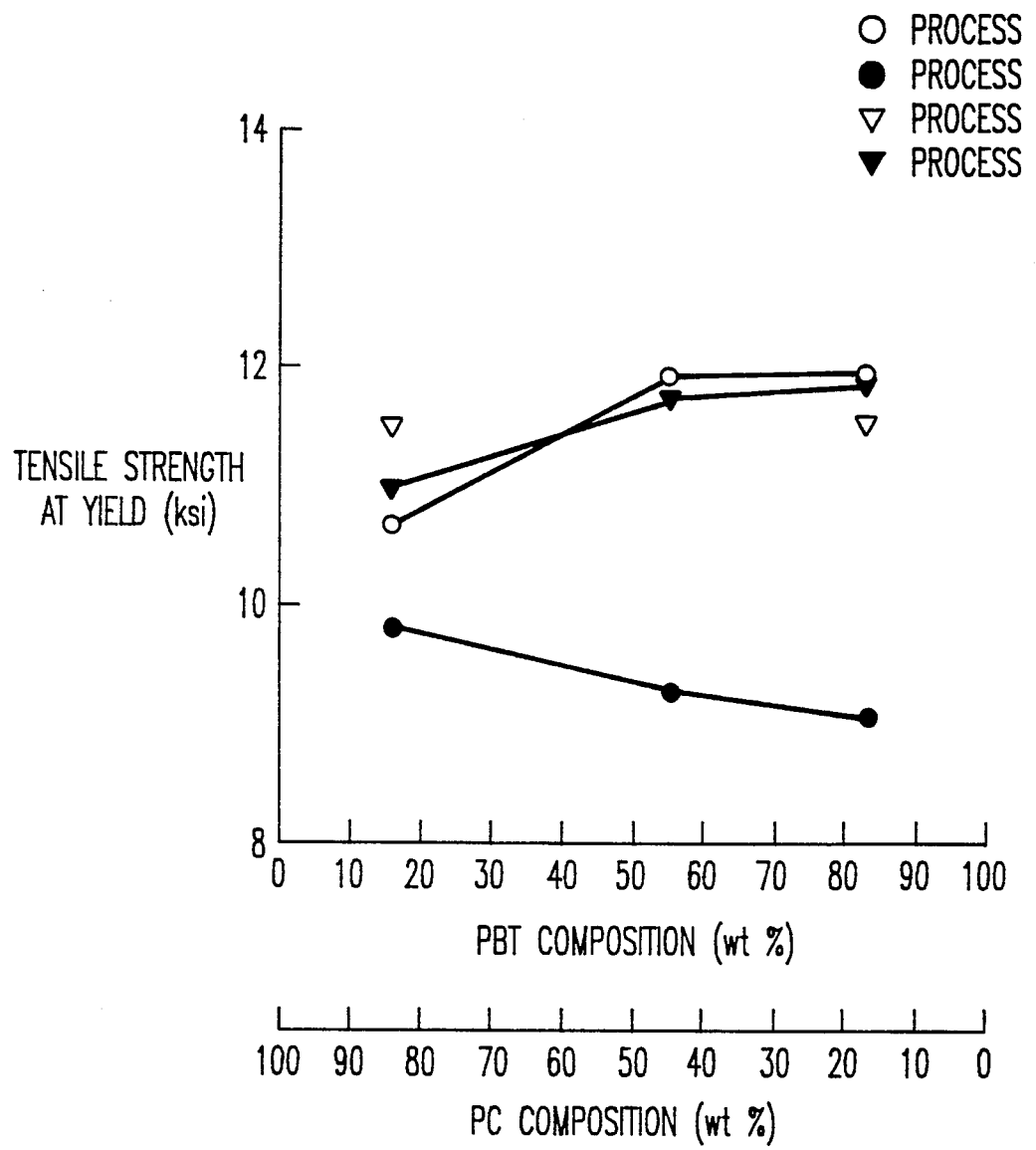
FIG. 2 shows tensile strength at yield properties of PBT/PC/LCP blends for varying PBT and PC composition.
Figure 3:
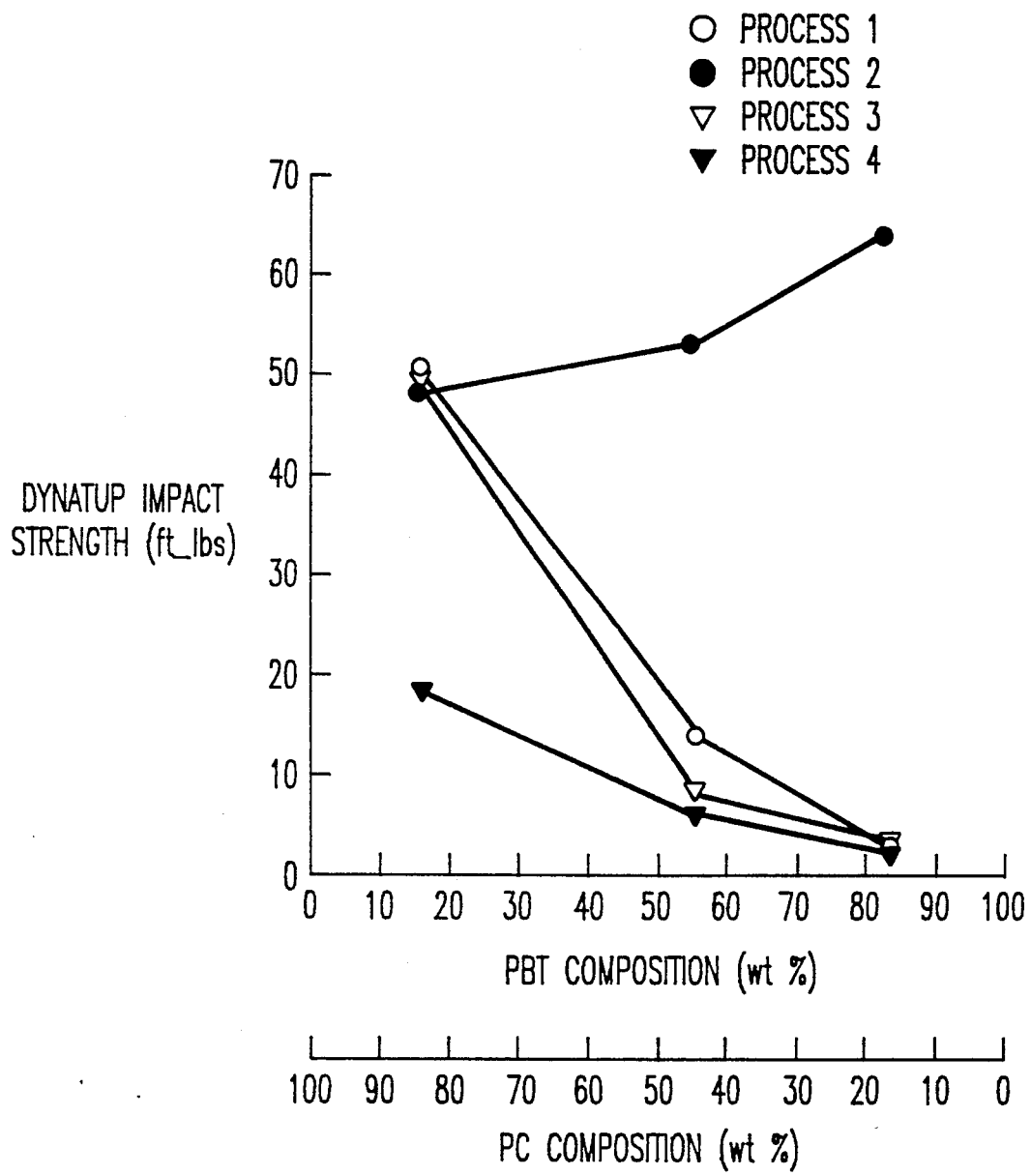
FIG. 3 shows impact strength properties of PBT/PC/LCP blends for varying PBT and PC composition.
Figure 4:
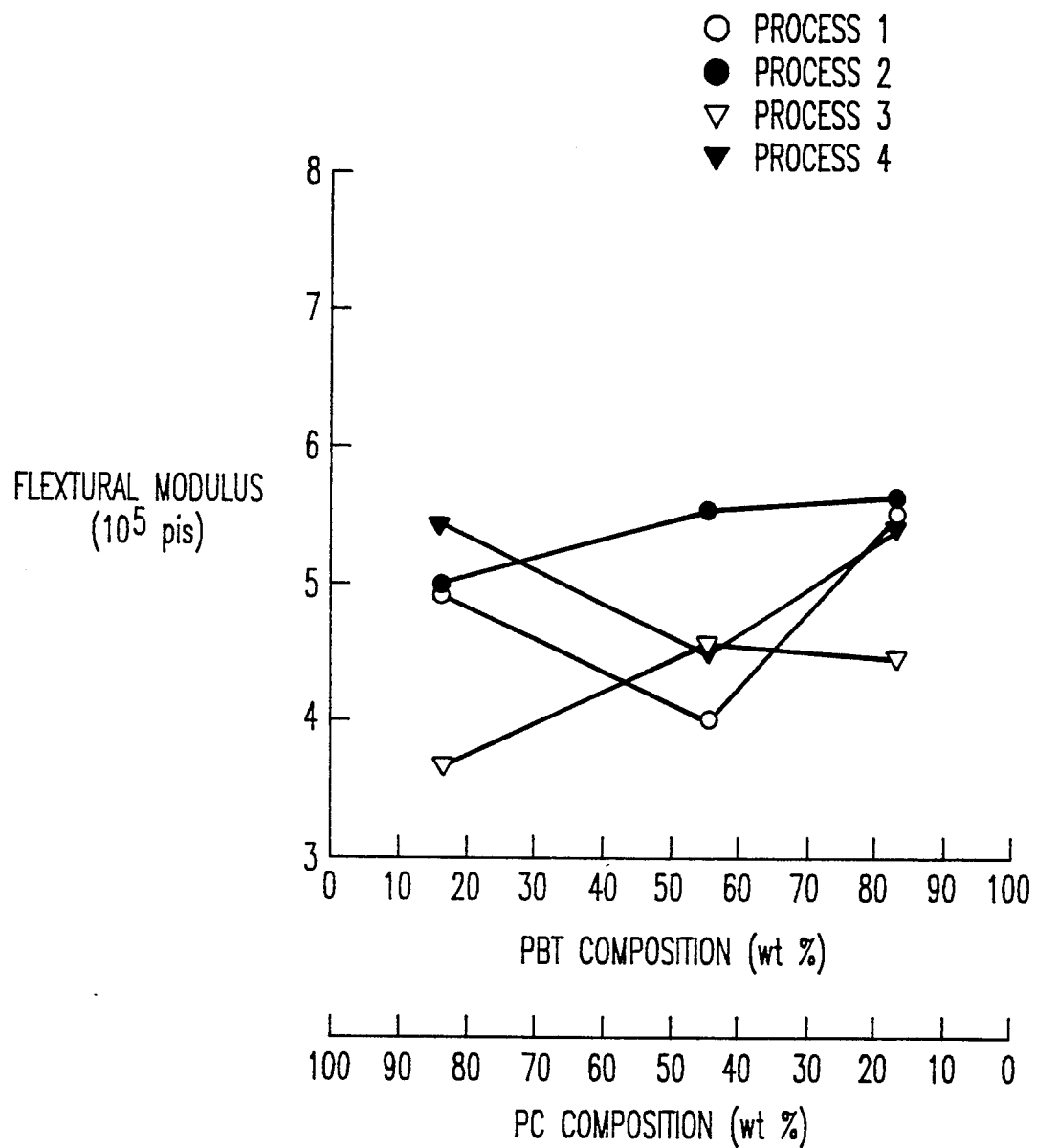
FIG. 4 shows flexural modulus properties of PBT/PC/LCP blends for varying PBT and PC composition.
Figure 5:
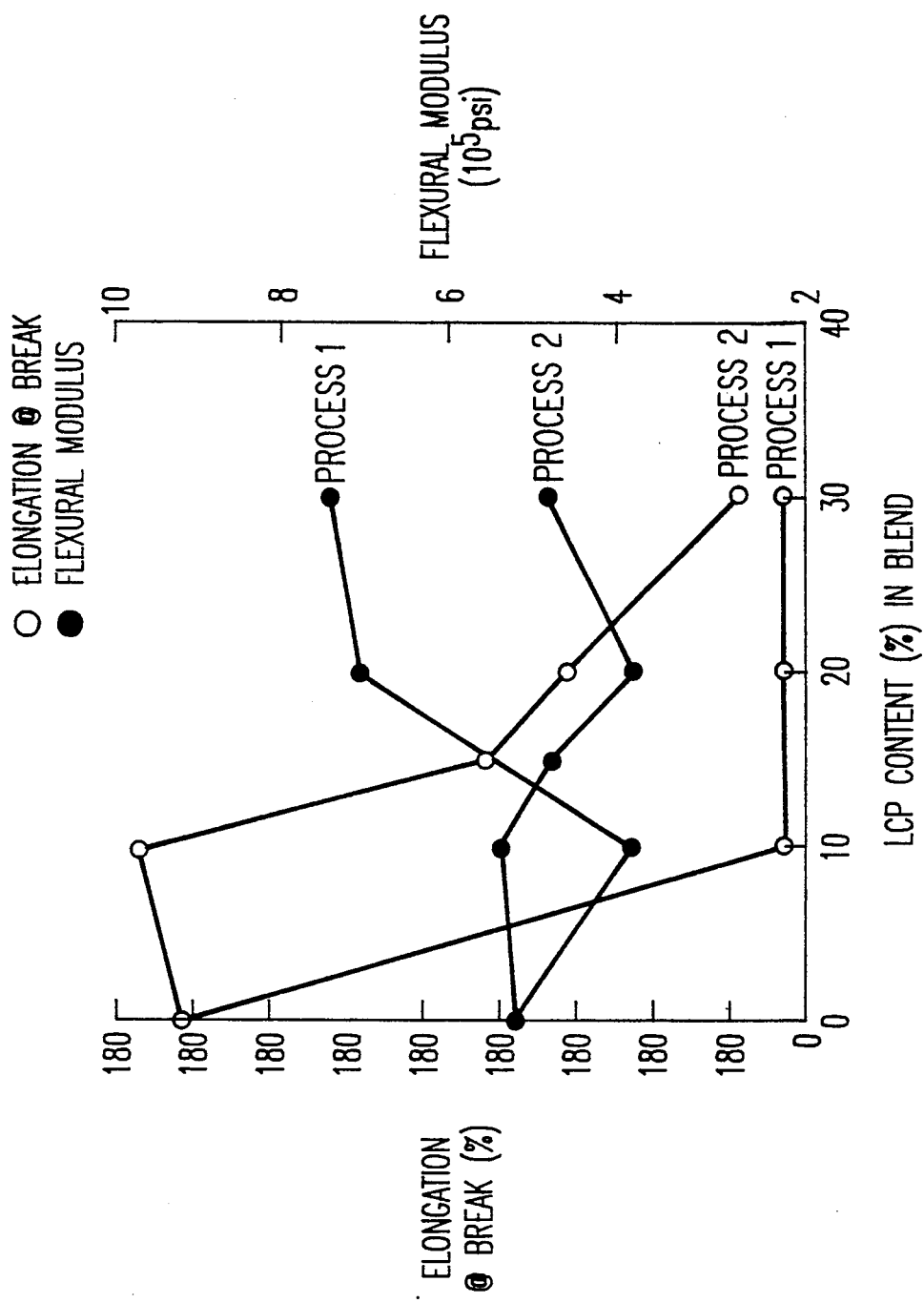
FIG. 5 shows elongation at break and flexural modulus properties for a PBT/PC composition having varying LCP content.
Figure 6:
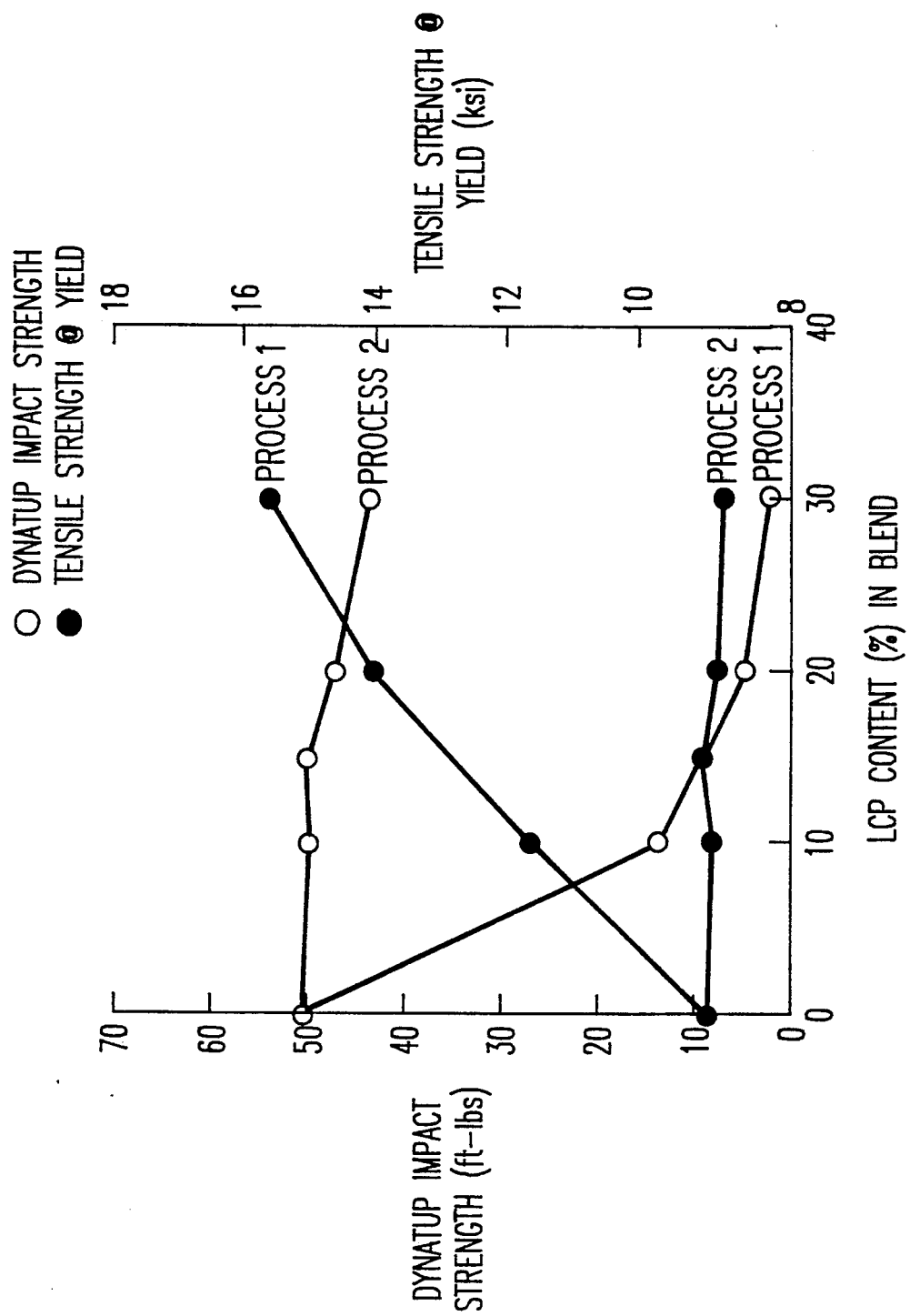
FIG. 6 shows impact strength and tensile strength at yield properties for a PBT/PC composition having varying LCP content.

The polymer compositions of the present invention contain a liquid crystal polymer, a polycarbonate and a polyester. The process of the present invention allows one to produce polymeric molding compositions from these polymers which have surprisingly good ductility and toughness properties, i.e., high impact strength and elongation at break. Additionally, other properties of interest in molding compositions such as tensile modulus and flexural modulus remain high in the compositions of the present invention. When injection molded, the polymer composition of the present invention provides lightweight, high modulus, high gloss, high heat resistant, tough, ductile and cosmetically appealing molded polymer articles which are useful, for example, in the aircraft, automotive and marine industrial fields. Further, the blends show normal mold shrinkage, not anisotropic shrinkage as is the case of conventional LCP blends. The compositions may be used to produce fibers, films and coatings as well as injection molded articles.

The compositions of the present invention contain (a) about 10-30 wt. % thermotropic liquid crystal polymer, (b) about 90-10 wt. % polycarbonate, and (c) about 10-90 wt. % thermoplastic polyester. The liquid crystal polymer is preferably contained in amounts of 10-20 wt. %, more preferably 10-15 wt. %. Polycarbonate is preferably present in amounts of 75-15 wt. % and polyester in amounts of 15-75 wt. %.

In a particularly preferred embodiment, the composition contains 10-15 wt. % LCP, 10-45 wt. % PC and 90-55 wt. % polyester. In an additional preferred embodiment, the composition contains 10-15 wt. % LCP, 90-55 wt. % PC and 10-45 wt. % polyester.

Suitable polyesters for the composition of the present invention are thermoplastic polyesters obtained from polycondensation of alkylene diols having 2-20 carbon atoms, including 1,4-cyclohexane dimethanol and aromatic dicarboxylic acids or esters thereof. It is also possible to use mixtures of various alkylene glycols and/or various dicarboxylic acids. Preferred alkylene glycols are ethanediol and 1,4-butanediol. Preferred dicarboxylic acids are terephthalic acid, isophthalic acid, 1,4-naphthalenedicarboxylic acid, 1,5-naphthalenedicarboxylic acid, 2,6-naphthalenedicarboxylic acid and 2,7-naphthalenedicarboxylic acid. A preferred embodiment is poly(1,4-cyclohexane dimethanol terephthalate). Particularly preferred are PBT and PET.

The relative viscosity of the polyesters is generally within the range from 1.2 to 1.8 dl/g (measured in 0.5% strength by weight solution in a 1:1 w/w phenol-dichlorobenzene mixture at 25° C.). Such polyesters are well-known in the art and commercially available.

The polyester must be compatible with the polycarbonate. The polyester, therefore, may be miscible with the polycarbonate, i.e., the two polymers are completely soluble in one another, exhibiting a single glass transition temperature and a single phase, or, alternatively, the polyester and polycarbonate may be used as a compatiblized blend or copolymer. By "compatible" as used herein, is meant a polyester/polycarbonate blend in which the minor component is well dispersed so that the dimensions of the interface are minimized to reduce crack formation along interface boundaries which result in loss of mechanical properties In compatible polymer blends, there is no gross phase separation between the components. Compatible polymer blends which may be used in the present invention include commercially available blends such as PBT/PC (XENOY from General Electric), PC/PA (e.g., the compatibilized blend DEXCARB from Dexter), PET/PC (e.g., the high impact compatibilized blend MACROBLEND from Mobay), PC-PE (the copolymer LEXAN PPC from General Electric), PCTG (the glycol modified copolyester KODAR from Kodak which may be alloyed with PC), and PET/PBT (VALOX blend from General Electric).

Polycarbonates which may be used in the composition of the present invention are polycarbonates which are prepared by condensation of a polyhydric phenol, such as a bisphenol, with a carbonic acid derivative such as phosgene. Suitable polycarbonates have a relative viscosity in the range of about 1.2-1.5 as measured in 0.5% strength by weight solution in dichloromethane at 25° C. Suitable polycarbonates are well-known in the art and disclosed, for example, in U.S. Pat. No. 5,011,884, U.S. Pat. No. 4,904,757, U.S. Pat. No. 4,460,735 and EP 0 265 791.

Liquid crystal polymers may be either lyotropic or thermotropic. Lyotropic liquid crystal polymers are polymers which are liquid crystalline in solution. Thermotropic liquid crystal polymers readily form liquid crystals in the melt phase. Such properties may be confirmed by conventional polarized light techniques using crossed polarizers by one having skill in the art.

The liquid crystal polymers used in the present invention are thermotropic liquid crystal polymers capable of passing through a nematic liquid crystal transition. Any LCP capable of exhibiting a nematic phase transition may be used in the compositions of the present invention. However, preferred thermotropic LCPs are wholly aromatic polyester liquid crystal polymers. Particularly preferred polyester LCPs are copolyesters of p-hydroxybenzoic acid and 2-hydroxy-6-naphthoic acid. Thermotropic polyester and polyesteramide LCPs are well known in the art and described, for example, in U.S. Pat. Nos. 3,636,595, 4,639,504, 4,563,508, 4,161,470 and 4,330,457. These U.S. patents are incorporated herein by reference for a more complete description of suitable polyester and polyesteramide LCPs and methods of preparing the same.

In addition to the three required components, i.e., the liquid crystal polymer, polycarbonate and polyester, the molding composition of the present claims may also contain up to about 50 wt. % of the usual additives, for example, fillers, stabilizers against thermal and oxidative degradation or against ultraviolet radiation, mold release agents, colorants such as dyes and pigments, and plasticizers. These additives are well known in the art and may be incorporated into the composition in known effective amounts for their desired purpose. These additives may be used in any amount which does not materially detract from the essential material properties of the molding composition, that is, improved elongation at break and high impact strength.

Conventionally, the components of a binary or ternary polymer blend are mixed together simultaneously in conventional mixers or kneaders or, optionally, precipitated from solution. Surprisingly, applicants have discovered that by modifying the conventional blending process, a substantial increase in elongation at break and impact resistance can be obtained in ternary blends of LCP, PC and polyester.

In the process of the present invention, one component is first preblended under melt mixing conditions with a second component. This preblend is then further combined or "let down" with the third component under melt mixing conditions to form the ternary blend of the present invention. In one embodiment, a PC/LCP preblend is formed and let down into the polyester. In a second embodiment, a polyester/LCP preblend is formed and let down into the PC. In a third embodiment, a polyester/PC preblend is formed and let down into the LCP. The embodiment in which a PC/LCP preblend is first formed and let down into the polyester is particularly preferred.

By using the three embodiments discussed above, one is able to control the properties of the ternary blend. The preferred embodiment in which a PC/LCP preblend is formed and let down into the polyester produces blends having good impact properties, flexural modulus, cosmetic appearance and normal shrinkage. The blend formed with this embodiment has normal shrinkage in both the flow and transverse directions, in contrast to conventional anisotropic blends which exhibit a substantially different shrinkage in the directions parallel to and perpendicular to the fiber orientation. The remaining two embodiments enable one to obtain engineering ternary blends containing LCP which have reinforced tensile strength, low elongation to break, fibrillated skin surfaces and anisotropic properties. In the preferred embodiment where the ternary composition contains 90–55 wt. % PC, high tensile strength and toughness are achieved using the preferred embodiment where a PC/LCP preblend is formed and let down into polyester and the embodiment in which a polyester/LCP preblend is formed and let down into PC. Using these guidelines, one is able to control selected properties of the ternary compositions of the present invention by employing one of the process embodiments or combinations thereof.

When a thermotropic LCP is blended with a flexible polymer such as polycarbonate and this blend is injection molded under proper conditions, the properties of the molded samples are characterized by high tensile strength and modulus and an improvement in heat deflection temperature. However, there is also a substantial reduction in the toughness and ductility properties such as elongation at break and Dynatup impact strength. Examination of the morphology of such samples shows the formation of high aspect ratio fibrils of non-uniform sizes especially on the surface of the molded samples. Similar properties and morphology occur when a LCP is blended simultaneously using conventional processing with both polycarbonate and a polyester.

It has now been discovered that when the LCP is first melt blended with PC and this blend is further blended with polyester, the resulting injection molded articles show a high level of toughness as measured by the elongation at break and Dynatup impact strength, as well as slight improvements in tensile and flexural strength, heat deflection temperature and flexural modulus. Furthermore, the morphology of the blend resulting from this two-step processing is different than the morphologies resulting from conventional simultaneous blending.

In the molded articles of the present invention resulting from the two-step processing noted above, the surface shows substantially the same morphology as the core of the sample, containing low aspect ratio LCP droplets of uniform and submicron sizes. In contrast to simultaneous blending of the components which results in high aspect ratio fibrils, particularly on the skin surface of the molded article, processing using the method of the present invention produces a novel blend in which there are substantially no fibrils in the skin or surface portion of a molded article and the LCP forms droplets in the core of the article.

As used herein, the term "fibril" is used to mean a high aspect ratio particle or structure in which the ratio of the longest dimension to the shortest dimension of the structure is greater than 10 (See U.S. Pat. No. 4,439,578). The term "droplet" as used herein with reference to structure morphology is used to mean a low aspect ratio particle or structure in which the ratio of the longest dimension to the shortest dimension of the structure is in the range of about 1.0–3.0, preferably about 1.0–2.0, more preferably about 1.0–1.5. For a particle or structure which is perfectly spherical, the aspect ratio (the ratio of the longest dimension to the shortest dimension) is 1.0.

The LCP droplets which form in the core of molded articles prepared by the two-step molding process of the present invention have particle sizes (average diameter) less than or equal to 1 micron, preferably less than or equal to 0.75 micron, more preferably less than or equal to 0.25 micron.

In the preferred embodiment of the present invention, the PC and LCP are melt blended to form a PC/LCP preblend. This preblend is then blended with polyester to form the ternary blend of the present invention. The PC, LCP and polyester may be blended in any convenient form, including pellets, granules, powders, etc.

It is essential to the process of the present invention in general and to the preferred embodiment in particular, that the LCP be melt blended at a temperature sufficient to allow the LCP to pass through a nematic liquid crystalline transition and form droplets within the polymer matrix. This formation of droplets produces a substantially isotropic blend of PC/LCP which is then further blended with polyester. In this second blending stage, the droplet form of the LCP is maintained. While not being bound by any particular theory, it is believed that the droplet shape of the LCP within the ternary blend gives rise to the improved toughness properties of the present composition. The absence of fibrils in the core and at the surface of molded articles prepared by the process of the present invention results in a substantial and surprising increase in elongation at break and impact strength properties.

Preblending of the LCP with the PC produces a polymer which has a greater viscosity at the melt blending temperature than the viscosity of the polyester into which this mixture is let down. The greater viscosity of the LCP/PC preblend results in the preblend remaining as a droplet dispersed throughout the polyester matrix. The dispersed droplets occur even when large pellets of the preblend are blended into the polyester. It is thought that the polycarbonate associates with the LCP due to the higher viscosity of the PC/LCP mixture relative to any of the three component polymers individually. Since the LCP is associated with the PC in droplet form, it is not free to agglomerate into higher aspect ratio fibrils seen with conventional processing where all three components are simultaneously blended. The lack of high aspect ratio fibril formation in the present invention results in the surprising ductility and impact strength properties.

It has been found that the impact strength of the polymer blend of the present invention is more accurately measured using the Dynatup disk method than with the Izod method. Both tensile strength and notched impact strength measurements depend on the anisotropy of the material being tested. Tensile strength and notched impact strength are generally low in the direction transverse to the fiber orientation axis, e.g., these fiber reinforced products split along the fiber axis. Anisotropic polymer blends having oriented LCP fibrils may exhibit suitably high Izod values but will exhibit substantially lower Dynatup values. For this reason, both Izod impact strength and Dynatup impact strength should be used in evaluating the impact resistance of polymer blends.

The desired ductility and toughness properties of the molding composition of the present invention are obtained when the LCP is present as a low aspect ratio particle or droplet having the dimensions described above. However, the molding composition may contain some droplets or particles having an aspect ratio greater than 3.0 so long as the properties of toughness, ductility, etc. are substantially the same as for a composition in which the aspect ratio is 1.0–3.0.

It is also possible to add various amounts of the preblend (PC/LCP) to a conventional three component blend of PC/LCP/polyester which has been previously mixed simultaneously according to conventional processing. This variation allows one to obtain both LCP droplets obtained from the preblend as well as higher aspect ratio fibrils obtained from the three component simultaneously blended composition. By mixing increasing amounts of the preblend, one is able to adjust the amount of low aspect ratio particles or droplets which arise from the preblend thereby incrementally increasing the toughness and ductility of the overall polymer blend. This flexibility allows one to utilize both the ductility and toughness properties obtained by the present blending process with the advantages of tensile strength and modulus obtained using higher aspect ratio fibrils conventionally known in the art.

Excellent toughness and ductility properties are also obtained when the molding composition contains a major amount of polycarbonate as the matrix resin. Compositions in which the polycarbonate comprises at least 55 wt. %, preferably 75 wt. % of the ternary composition exhibit good tensile strength and modulus properties as well as improved ductility and impact strength. The manner in which the three components are blended is less important in this embodiment and good properties are obtained for both simultaneous blending and two-step blending of the three components. Compositions containing at least 55 wt. % polycarbonate, 10–15 wt. % LCP and 10–45 wt. % polyester are within the scope of the present invention whether prepared by simultaneous blending of all three components or by preblending two components followed by letdown into the third component.

In the process of the present invention, the LCP may be melt blended at any temperature sufficient to allow the LCP to pass through a nematic liquid crystalline transition. This temperature will obviously depend on the specific LCP employed in the process. The desired melt mixing temperature which allows the LCP to pass through a nematic liquid crystalline transition can be readily determined by one having ordinary skill in the art and used in the present process. Generally, melt blending temperatures will range from about 200°–400° C., preferably about 250°–350° C., although for specific thermotropic LCPs, the nematic transition temperature may be above or below this general range.

The melt blending may be accomplished using conventional single or double screw extruders, Banbury sigma blade mixers or the mixing section of a Braebender torque rheometer, for example. The melt blended binary mixture is then melt blended with the third polymer to form the ternary composition of the present invention. The melt blending conditions of this second blending step are substantially the same as those described above for the primary melt blending. The ternary blend may then be injection molded using conventional injection molding apparatus and conditions.

In the preferred embodiment, a binary PC/LCP blend is produced in an extruder heated to the desired temperature and then pelletized. The pelletized PC/LCP blend may then be combined with polyester, melt processed in an extruder and pelletized to form pellets of the ternary composition which may be injection molded. Similar properties are obtained, however, by eliminating the final extrusion and pelletizing of the ternary blend. That is, it is possible to obtain similar composition properties by physically mixing pellets of the PC/LCP binary blend with polyester pellets and injection molding this mixture directly, for example. This embodiment has the advantage of eliminating an additional processing step.

Other features of the invention will become apparent in the course of the following descriptions of exemplary embodiments which are given for illustration of the invention and are not intended to be limiting thereof.

EXAMPLES

The extruder used was a Haake Model 90 Rheometer with twin conical non-vented screws. The Haake breaker plate and die assembly was replaced with an in-house designed unit to reduce the hold up at the discharge end of the extruder. The die set up was modified by machining a new die with shallow channels to cover the screw tips and thus minimize the quantity of material held up in the die. The die was attached directly to the breaker plate. The original configuration of breaker plate and die assembly had a free volume of 25 ml. The modified die assembly had a fee volume of only 3.77 ml.

The molding was done on a Nissei 80 ton injection molding machine Model FS80S12 ASE, equipped with a Whitelock Model R1102C-10 pellet dryer-feeder. The mold was ASTM combination tensile flex and disc mold (50 gram shot size) which was heated with an Application Engineering model TDW-1ME hot water circulating heater.

An Instron model 4206 mechanical testing machine was used for testing the tensile properties based on ASTM D638 and for flexural properties based on the ASTM D790 three-point loading method. After notching the sample on a notching cutter model TMI 22-05 (Testing Machines Inc.), the Izod impact testing was performed on a Tinius Olsen model 66 Charpy Izod testing machine and the testing method was based on ASTM D256. Dynatup impact strength was obtained from a Dynatup impact tester based on ASTM D3763.

The following are the general procedures for preparing the ternary blends for each of four processes. The specific charges and extrusion and injection molding conditions are tabulated in the enclosed tables.

PROCESS 1:

a) Blend charges (weights of the components)

A mixture of the desired amounts (see Tables) of Vectra A-950 pellets, Lexan 141 polycarbonate pellets and Celanex 1600A polybutylene terephthalate pellets were blended together in a Patterson-Kelly 8 quart Cross Flow Blender and dried overnight at 225° F. in a drying oven (Lydon Brothers Corp. Model No. 1330-1-13) equipped with a Universal Dynamics Corp. Model No. AM-15 dehumidifier.

b) Extrusion of the blend

The ternary blend was compounded on the Haake Model 90 Rheometer with twin conical non-vented screws. The extrusion conditions for the materials using process 1 are shown in the last 5 entries of Table 1. The extrudate of the blend was passed through a water bath and blow dried to cool the strands so that they could be passed through the pelletizer.

c) Injection molding of the ternary blend

The pellets were dried at 225° F. overnight in a desiccated forced air drying oven prior to molding. The molding conditions for the process 1 materials are the first five entries in the table on injection molding conditions (Table 2).

PROCESS 2:

a) Preparation of the PC/LCP preblend

The procedure to prepare the preblends for process 2 is similar to that used to blend the ingredients in process 1.

b) Extrusion of the PC/LCP preblend.

The binary blend of PC/LCP pellets are extruded and pelletized according to the conditions in Table 1 (the first six entries).

c) PBT letdown formulations of the PC/LCP preblends

A mixture of PBT and PC/LCP preblend pellets were tumble blended and dried at 225 F in a desiccated oven overnight prior to injection molding. This mixture of pellets can be directly injection molded.

The mixture of pellets was also passed through the Haake extruder to provide the ternary blend in a uniform pellet form for injection molding.

d) Injection molding of the PBT letdown blends

The conditions for the molding of the letdown blends of process 2 are listed in the table on injection molding conditions (Table 2). These are the second six entries in the table.

PROCESS 3:

a) Preparation of the PBT/LCP preblend

The procedure to prepare the PBT/LCP preblend was the same as for processes 1 and 2 above.

b) Extrusion of the PBT/LCP preblends

The dried PBT/LCP pellet blends were extruded in the Haake extruder according to the conditions set forth in Table 1.

c) PC letdown of the PBT/LCP preblend

The pellet charges were tumble blended and dried at 225° F. overnight in the desiccated drying oven prior to injection molding.

d) Injection molding of the PC letdown blends

The dried blend of PC pellets and the pelletized PBT/LCP preblend were injection molded under the conditions set forth in Table 2 on injection molding conditions. These are the third set of entries in the table.

PROCESS 4 a) Preparation of the PBT/PC preblend and/or the controls

The procedure to prepare the PBT/PC preblend or the control blends were the same as with the other processes.

b) Extrusion of the PBT/PC blends

The PBT/PC blends were dried at 225° F. overnight and extruded in the Haake extruder under the conditions put forth in Table 1 of extrusion conditions.

c) LCP letdown of the PBT/PC preblend

The pellet charges were tumble blended and dried at 225° F. in a desiccated oven overnight prior to injection molding.

d) Injection molding of the LCP letdown blend

The dried blend of LCP pellets and the pelletized PBT/PC preblend were injection molded under the conditions set forth in Table 2 on injection molding conditions.

The controls were the blends of PBT and PC which have no LCP. These were molded and tested to measure the effects of the LCP introduced by the various processes on the properties of these materials. The controls have the same PBT/PC ratio as in the blends with the LCP present.

e) Injection molding of the control samples

The dried pellets prepared by process 4b) above, were injection molded according to the conditions set forth in Table 2 on injection molding conditions; last three entries in the table.

TABLE 1

Extrusion Conditions of PBT/PC/LCP Blends

| Material (wt. %) | Process No. | Processing Temperture (°C.) Feeding Zone | Melting Zone | Metering Zone | Rotation Speed (RPM) | Feed Rate (Dial) | Throughout (gram/min) |
|---|---|---|---|---|---|---|---|
| PC/LCP (88.24/11.76) | 2 | 275 | 275 | 270 | 140 | 150 | 14.1 |
| PC/LCP (80/20) | 2 | 275 | 275 | 270 | 200 | 400 | 38.3 |
| PC/LCP (71.58/28.42) | 2 | 280 | 275 | 265 | 200 | 400 | 32.4 |
| PC/LCP (64/36) | 2 | 260 | 280 | 270 | 200 | 150 | 12.5 |
| PC/LCP (60/40) | 2 | 275 | 275 | 270 | 140 | 100 | 6.2 |
| PC/LCP (50.9/49.1) | 2 | 270 | 280 | 270 | 200 | 220 | 21.6 |
| PBT/LCP (88.24/11.76) | 3 | 280 | 275 | 260 | 140 | 300 | 41.2 |
| PBT/LCP (83.33/16.67) | 3 | 280 | 275 | 260 | 120 | 200 | 25.7 |
| PBT/LCP (60/40) | 3 | 250 | 250 | 240 | 120 | 170 | 19.7 |
| PBT/PC (83.33/16.67) | 4 | 275 | 265 | 255 | 200 | 350 | 54.1 |
| PBT/PC (55.55/44.45) | 4 | 265 | 255 | 250 | 200 | 500 | 61.0 |
| PBT/PC (16.67/83.33) | 4 | 280 | 275 | 265 | 170 | 230 | 24.6 |
| PBT/PC/LCP (75/15/10) | 1 | 260 | 260 | 260 | 90 | 200 | 24.1 |
| PBT/PC/LCP (50/40/10) | 1 | 265 | 260 | 260 | 200 | 500 | 59.0 |
| PBT/PC/LCP (44.44/35.56/20) | 1 | 270 | 270 | 260 | 200 | 500 | 69.2 |
| PBT/PC/LCP (38.89/31.11/30) | 1 | 270 | 270 | 260 | 200 | 500 | 53.2 |
| PBT/PC/LCP (15/75/10) | 1 | 270 | 270 | 260 | 200 | 400 | 41.2 |

TABLE 2

Injection Molding Conditions of PBT/PC/LCP Blends

| Material (wt. %) | Process No. | Barrel Temperature (°F.) Rear | Middle | Front | Nozzle | Mold Temperature (°F.) Fixed | Moving |
|---|---|---|---|---|---|---|---|
| PBT/PC/LCP (15/75/10) | 1 | 510 | 520 | 525 | 525 | 180 | 180 |
| PBT/PC/LCP (50/40/10) | 1 | 490 | 490 | 490 | 500 | 150 | 150 |
| PBT/PC/LCP (75/15/10) | 1 | 500 | 500 | 500 | 510 | 150 | 150 |
| PBT/PC/LCP (44.44/35.56/20) | 1 | 490 | 490 | 490 | 500 | 150 | 150 |
| PBT/PC/LCP (38.89/31.11/30) | 1 | 490 | 490 | 490 | 500 | 150 | 150 |
| (PC/LCP) + PBT (15/75/10) | 2 | 510 | 520 | 525 | 525 | 180 | 180 |
| (PC/LCP) + PBT (50/40/10) | 2 | 490 | 490 | 490 | 500 | 150 | 150 |
| (PC/LCP) + PBT (75/15/10) | 2 | 480 | 480 | 480 | 485 | 150 | 150 |
| (PC/LCP) + PBT (47.22/37.78/15) | 2 | 490 | 490 | 490 | 500 | 150 | 150 |
| (PC/LCP) + PBT (44.44/35.56/20) | 2 | 490 | 490 | 490 | 500 | 150 | 150 |
| (PC/LCP) + PBT (38.89/31.11/30) | 2 | 490 | 490 | 490 | 500 | 150 | 150 |
| (PBT/LCP) + PC (15/75/10) | 3 | 510 | 510 | 525 | 525 | 180 | 180 |
| (PBT/LCP) + PC (50/40/10) | 3 | 490 | 490 | 490 | 500 | 150 | 150 |
| (PBT/LCP) + PC (75/15/10) | 3 | 500 | 500 | 500 | 510 | 150 | 150 |
| (PBT/PC) + LCP (15/75/10) | 4 | 510 | 520 | 525 | 525 | 180 | 180 |
| (PBT/PC) + LCP (50/40/10) | 4 | 490 | 490 | 490 | 500 | 150 | 150 |
| (PBT/PC) + LCP (75/15/10) | 4 | 500 | 500 | 500 | 510 | 150 | 150 |
| PBT/PC | * | 500 | 500 | 500 | 510 | 150 | 150 |

TABLE 2-continued

Injection Molding Conditions of PBT/PC/LCP Blends

| Material | | | | | | |
|---|---|---|---|---|---|---|
| (83.33/16.67) | | | | | | |
| PBT/PC (55.55/44.45) | * | 490 | 490 | 490 | 500 | 150 | 150 |
| PBT/PC (16.67/83.33) | * | 510 | 520 | 525 | 525 | 150 | 150 |

| Material (wt. %) | Process No. | Melt Temperature (°C.) | Max. Injection Pressure (psi) | Packing Pressure (psi) | Hold Pressure (psi) | Back Pressure (psi) | Cycle Time (sec) |
|---|---|---|---|---|---|---|---|
| PBT/PC/LCP (15/75/10) | 1 | 291 | 15732 | 10813 | 9975 | 69 | 41.1 |
| PBT/PC/LCP (50/40/10) | 1 | 284 | 13783 | 11694 | 8307 | 92 | 41.4 |
| PBT/PC/LCP (75/15/10) | 1 | | 14154 | 10000 | 8307 | 0 | 46.0 |
| PBT/PC/LCP (44.44/35.56/20) | 1 | 295 | 17379 | 12483 | 8283 | 92 | 41.2 |
| PBT/PC/LCP (38.89/31.11/30) | 1 | 296 | 13203 | 11625 | 8260 | 92 | 41.4 |
| (PC/LCP) + PBT (15/75/10) | 2 | 299 | 13017 | 10789 | 9954 | 92 | 41.2 |
| (PC/LCP) + PBT (50/40/10) | 2 | 298 | 13852 | 10766 | 8260 | 92 | 45.9 |
| (PC/LCP) + PBT (75/15/10) | 2 | 285 | | 13411 | 10047 | 23 | 46.0 |
| (PC/LCP) + PBT (47.22/37.78/15) | 2 | 289 | 13667 | 10789 | 9095 | 92 | 41.1 |
| (PC/LCP) + PBT (44.44/35.56/20) | 2 | 297 | 13574 | 10813 | 9142 | 92 | 41.0 |
| (PC/LCP) + PBT (38.89/31.11/30) | 2 | 287 | 13783 | 10813 | 9142 | 92 | 41.0 |
| (PBT/LCP) + PC (15/75/10) | 3 | 292 | 13063 | 10859 | 8330 | 69 | 41.0 |
| (PBT/LCP) + PC (50/40/10) | 3 | 278 | 13643 | 11693 | 9142 | 92 | 41.1 |
| (PBT/LCP) + PC (75/15/10) | 3 | 289 | 13226 | 10766 | 6566 | 92 | 31.1 |
| (PBT/PC) + LCP (15/75/10) | 4 | 301 | 14873 | 10836 | 10000 | 92 | 41.0 |
| (PBT/PC) + LCP (50/40/10) | 4 | 279 | 13667 | 11671 | 9142 | 92 | 41.0 |
| (PBT/PC) + LCP (75/15/10) | 4 | 282 | 12483 | 9931 | 6566 | 92 | 31.0 |
| PBT/PC (83.33/16.67) | * | | | | | 69 | |
| PBT/PC (55.55/44.45) | * | 279 | 14340 | 11694 | 9165 | 92 | 36.1 |
| PBT/PC (16.67/83.33) | * | 299 | 12947 | 10813 | 9977 | 92 | 41.1 |

*Control

TABLE 3

Mechanical and Thermal Properties of PBT/PC/LCP Blends

| Material (wt. %) | Tensile Strength Yield (psi) | Tensile Strength Ultimate (psi) | Tensile Modulus ($10^5$ psi) | Elongation Yield (%) | Elongation Rupture (%) | Flexural Strength (psi) | Flexural Modulus ($10^5$ psi) |
|---|---|---|---|---|---|---|---|
| Process 1 (Simultaneous) | | | | | | | |
| PBT/PC/LCP (15/75/10) | 10654 | 8446 | 2.453 | 6.585 | 80.556 | 10287 | 4.918 |
| PBT/PC/LCP (50/40/10) | 11875 | 12191 | 3.070 | 4.930 | 5.476 | 10850 | 4.018 |
| PBT/PC/LCP (75/15/10) | 11902 | 11591 | 2.950 | 5.909 | 6.629 | 10436 | 5.513 |
| PBT/PC/LCP (44.44/35/56/20) | 14162 | 14504 | 3.802 | 4.906 | 5.390 | 12554 | 7.136 |
| PBT/PC/LCP (38.89/31.11/30) | 15672 | 16028 | 3.658 | 5.273 | 5.651 | 13572 | 7.482 |
| Process 2 - PBT letdown | | | | | | | |
| (PC/LCP) + PBT (15/75/10) | 9804 | 8328 | 2.309 | 6.557 | 88.816 | 9340 | 5.002 |
| (PC/LCP) + PBT (50/40/10) | 9196 | 6652 | 2.156 | 5.777 | 172.987 | 9190 | 5.536 |
| (PC/LCP) + PBT (75/15/10) | 9080 | 4818 | 2.351 | 5.377 | 97.978 | 9239 | 5.663 |
| (PC/LCP) + PBT (47.22/37.78/15) | 9336 | 5714 | 2.311 | 5.657 | 83.505 | 9189 | 4.946 |
| (PC/LCP) + PBT (44.44/35.56/20) | 9114 | 5856 | 2.156 | 5.822 | 62.122 | 8898 | 3.996 |
| (PC/LCP) + PBT (38.89/31.11/30) | 9011 | 5720 | 2.273 | 5.568 | 17.399 | 8976 | 4.978 |
| Process 3 - PC letdown | | | | | | | |
| (PC/LCP) + PC (15/75/10) | 11451 | 8111 | 2.477 | 6.957 | 22.814 | 10456 | 3.661 |
| (PC/LCP) + PC (50/40/10) | — | 12158 | 3.100 | — | 5.648 | 11079 | 4.561 |
| (PC/LCP) + PC (75/15/10) | 11492 | 11427 | 2.609 | 5.976 | 6.704 | 10371 | 4.460 |
| Process 4 - LCP letdown | | | | | | | |
| (PBT/PC) + LCP (15/75/10) | 10928 | 7886 | 2.510 | 6.767 | 19.324 | 10387 | 5.403 |

TABLE 3-continued
Mechanical and Thermal Properties of PBT/PC/LCP Blends

| | | | | | | | |
|---|---|---|---|---|---|---|---|
| (PBT/PC) + LCP (50/40/10) | 11676 | 11830 | 3.079 | 5.104 | 5.691 | 10800 | 4.473 |
| (PBT/PC) + LCP (75/15/10) | 11782 | 11918 | 2.810 | 5.487 | 5.924 | 10635 | 5.402 |
| Control | | | | | | | |
| PBT/PC (83.33/16.67) | 8718 | 5153 | 2.364 | 5.044 | 69.251 | 8338 | 2.474 |
| PBT/PC (55.55/44.45) | 9256 | 8204 | 2.342 | 5.551 | 162.912 | 9109 | 2.950 |
| PBT/PC (16.67/83.33) | 9983 | 9258 | 2.348 | 6.488 | 111.810 | 9360 | 3.139 |

| Material (wt. %) | Izod Impact Strength Notched, ⅛" (ft-lbs/in) | Dynatup Impact Strength (ft-lbs) | Heat Deflection Temperature 66 psi (°C.) | Heat Deflection Temperature 264 psi (°C.) | Vicat Softening Temperature (°C.) |
|---|---|---|---|---|---|
| Process 1 (Simultaneous) | | | | | |
| PBT/PC/LCP (15/75/10) | 3.87 | 50.62 | | | |
| PBT/PC/LCP (50/40/10) | 3.41 | 13.96 | | | |
| PBT/PC/LCP (75/15/10) | 3.08 | 2.69 | 177.5 | 77.3 | 212.2 |
| PBT/PC/LCP (44.44/35.56/20) | 3.04 | 4.98 | | | |
| PBT/PC/LCP (38.89/31.11/30) | 2.91 | 2.27 | | | |
| Process 2 - PBT letdown | | | | | |
| (PC/LCP) + PBT (15/75/10) | 3.83 | 47.89 | | | |
| (PC/LCP) + PBT (50/40/10) | 2.76 | 49.84 | | | |
| (PC/LCP) + PBT (75/15/10) | 2.41 | 63.66 | 114.8 | 71.7 | 215.5 |
| (PC/LCP) + PBT (47.22/37.78/15) | 2.90 | 49.92 | | | |
| (PC/LCP) + PBT (44.44/35.56/20) | 3.20 | 47.18 | | | |
| (PC/LCP) + PBT (38.89/31.11/30) | 2.55 | 43.74 | | | |
| Process 3 - PC letdown | | | | | |
| (PC/LCP) + PC (15/75/10) | 4.68 | 49.22 | | | |
| (PC/LCP) + PC (50/40/10) | 3.69 | 8.24 | | | |
| (PC/LCP) + PC (75/15/10) | 2.83 | 3.27 | | | |
| Process 4 - LCP letdown | | | | | |
| (PBT/PC) + LCP (15/75/10) | 4.50 | 18.33 | | | |
| (PBT/PC) + LCP (50/40/10) | 3.70 | 6.10 | | | |
| (PBT/PC) + LCP (75/15/10) | 2.03 | 2.05 | | | |
| Control | | | | | |
| PBT/PC (83.33/16.67) | 5.26 | 44.71 | 78.4 | 61.6 | 210.7 |
| PBT/PC (55.55/44.45) | 4.13 | 50.51 | | | |
| PBT/PC (16.67/83.33) | 12.91 | 51.89 | | | |

TABLE 4
Mechanical and Thermal Properties of PET/PC/LCP Blends

| Material (wt. %) | Process No. | Tensile Strength Yield (psi) | Tensile Strength Ultimate (psi) | Tensile Modulus ($10^5$ psi) | Elongation Yield (%) | Elongation Rupture (%) | Flexural Strength (psi) | Flexural Modulus ($10^5$ psi) |
|---|---|---|---|---|---|---|---|---|
| PET/PC (83.33/16.67) | * | 9162 | 3162 | 2.305 | 5.661 | 148.360 | 8948 | 2.800 |
| High | | 9226 | 4799 | 2.374 | 5.765 | 222.921 | 9091 | 2.957 |
| Low | | 9081 | 997 | 2.251 | 5.501 | 76.081 | 8701 | 2.486 |
| PET/PC/LCP (75/15/10) | 1 | 11813 | 11610 | 2.885 | 6.021 | 6.684 | 10386 | 5.559 |
| High | | 11894 | 11801 | 2.981 | 6.044 | 6.693 | 10583 | 6.210 |
| Low | | 11690 | 11305 | 2.793 | 5.998 | 6.542 | 10131 | 5.272 |
| (PC/LCP) letdown w/PET | 2 | 9092 | 3720 | 2.372 | 5.589 | 89.560 | 8999 | 5.261 |
| High | | 9217 | 4277 | 2.449 | 5.747 | 147.484 | 9071 | 5.533 |
| Low | | 9030 | 2816 | 2.312 | 5.406 | 37.414 | 8969 | 4.922 |

| Material (wt. %) | Process No. | Izod Impact Strength Notched, ⅛" (ft-lbs/in) | Dynatup Impact Strength (ft-lbs) | Heat Deflection Temperature 66 psi (°C.) | Heat Deflection Temperature 264 psi (°C.) | Vicat Softening Temperature (°C.) |
|---|---|---|---|---|---|---|
| PET/PC (83.33/16.67) | * | 3.20 | 48.66 | 79.9 | 81.4 | 97.1 |
| High | | 3.83 | 50.08 | 80.7 | 81.9 | 100.3 |
| Low | | 2.55 | 47.53 | 79.0 | 80.9 | 93.8 |
| PET/PC/LCP (75/15/10) | 1 | 2.66 | 3.46 | 86.7 | 87.9 | 101.6 |
| High | | 3.69 | 4.03 | 87.8 | 89.6 | 101.9 |
| Low | | 2.34 | 2.57 | 85.9 | 85.3 | 101.3 |
| (PC/LCP) letdown w/PET | 2 | 2.24 | 23.70 | 82.7 | 83.5 | 99.9 |
| High | | 2.95 | 50.00 | 83.5 | 83.7 | 100.5 |
| Low | | 1.40 | 2.09 | 82.3 | 83.4 | 99.2 |

*Control

TABLE 5

Comparison of the Morphologies of PBT/PC/LCP Blends Prepared by the Four Processes with Key Mechanical Properties

| Process | Formulation (wt. %) PBT/PC/LCP | Morphology Skin | Morphology Core | Tensile Strength (psi) | Dynatup Impact (ft-lbs) | Elongation Break (%) |
|---|---|---|---|---|---|---|
| 1 (PBT + PC + LCP) | 15/75/10 | No Fibrils Textured Break | Nodules/ Droplets/ Rods ≦ 0.75 Micron | 10,654 | 50.6 | 80.6 |
|  | 50/40/10 | Fibrils | Nodules/ Droplets/ Rods ≦ 1.0 Micron | 11,875 | 14.0 | 5.5 |
|  | 75/15/10 | Fibrils | Nodules/ 0.3–0.5 Microns Droplet/ Rod Formation | 11,902 | 2.7 | 6.6 |
| 2 (PC/LCP + PBT) | 15/75/10 | No Fibrils | Nodules, 0.1–0.5 Microns/ Droplets (Tailed)/Few Fibrils ≦ Micron | 9,804 | 47.9 | 88.8 |
|  | 50/40/10 | No Fibrils | Droplet (Tailed) ≦ 0.25 Micron | 9,196 | 50.0 | 173 |
|  | 75/15/10 | No Fibrils Particles - 10 Micron Clusters | Droplet (Tailed) ≦ 0.25 Micron | 9,080 | 64 | 98 |
| 3 (PBT/LCP) + PC | 15/75/10 | Fibrils | Droplet (Tailed) 0.25–2 Microns, Rod Form 1 Micron | 11,451 | 49 | 22.8 |
|  | 50/40/10 | Fibrils ≧ 10 Microns | Rod Form 1–3 Micron Diameter Droplets <1 Micron | 12,158 | 8.2 | 5.7 |
|  | 75/15/10 | Fibrils | Rods 1–2 Microns Droplets <1 Micron (Tailed) | 11,492 | 3.3 | 6.7 |
| 4 (PBT/PC + LCP) | 15/75/10 | No Fibrils | Droplets (Tailed) <0.25 Micron, Microfibrils <0.25 Microns | 10,928 | 18.3 | 19.3 |
|  | 50/40/10 | Fibrils 5->60 Microns Diameter | Droplets ≦ Micron, Rods ca. 1 Micron Diameter | 11,676 | 6.1 | 5.7 |
|  | 75/15/10 | Fibrils | Droplets Rods ≦ Micron | 11,782 | 2.05 | 5.9 |

Obviously, numerous modifications and variations of the present invention are possible in light of the above teachings. It is therefore to be understood that within the scope of the appended claims, the invention may be practiced otherwise than as specifically described herein

What is claimed as new and desired to be secured by letters patent of the United States is:

1. A polymer molding composition, comprising (a) a thermotropic liquid crystal polymer, (b) a polycarbonate, and (c) a polyester, wherein said liquid crystal polymer is present as low aspect ratio particles wherein the ratio of the longest dimension of the particle to the shortest dimension of the particle is in the range of about 1.0–3.0, and wherein said liquid crystal polymer is not present as high aspect ratio fibrils wherein the ratio of the longest dimension to the shortest dimension of the fibril is greater than 10.

2. The composition of claim 1, wherein said liquid crystal polymer is present as a low aspect ratio particle having an aspect ratio of about 1.0–2.0.

3. The composition of claim 1, wherein said liquid crystal polymer is present as a low aspect ratio particle having an aspect ratio of about 1.0–1.5.

4. The composition of claim 1, wherein said liquid crystal particles have a particle size less than or equal to 1 micron.

5. The composition of claim 1, wherein the liquid crystal polymer particles have a particle size less than or equal to 0.25 micron.

6. The composition of claim 1, comprising 10–30 wt. % liquid crystal polymer, 90–10 wt. % polycarbonate and 10–90 wt. % polyester.

7. The composition of claim 6, comprising 10–20 wt. % liquid crystal polymer.

8. The composition of claim 1, comprising 10–15 wt. % liquid crystal polymer, 10–45 wt. % polycarbonate and 90–55 wt. % polyester.

9. The composition of claim 1, comprising 10–15 wt. % liquid crystal polymer, 90–55 wt. % polycarbonate and 10–45 wt. % polyester.

10. The composition of claim 1, wherein said polyester is prepared by the polycondensation of $C_{2-20}$ alkylene diols with aromatic dicarboxylic acids or esters thereof.

11. The composition of claim 10, wherein said polyester is polybutylene terephthalate or polyethylene terephthalate.

12. A process for preparing a ternary polymer molding composition, comprising the steps of:
 (i) melt blending a binary polymer mixture to form a preblend, and then
 (ii) melt blending said preblend with a third polymer to form a ternary polymer blend, wherein
  (a) said binary polymer mixture is a polycarbonate/liquid crystal polymer mixture and said third polymer is a polyester,
  (b) said binary polymer mixture is a polyester/liquid crystal polymer mixture and said third polymer is a polycarbonate, or
  (c) said binary polymer mixture is a polyester/polycarbonate mixture and said third polymer is a liquid crystal polymer,
wherein at least one of said melt blending steps is conducted at a temperature at which said liquid crystal polymer can undergo a nematic liquid crystalline transition.

13. The process of claim 12, wherein said at least one melt blending step is conducted at a temperature of about 200°–400° C.

14. The process of claim 12, wherein said at least one melt blending step is conducted at a temperature of about 250°–350° C.

15. The process of claim 12, wherein each of said melt blending steps is conducted in an extruder.

16. The process of claim 12, wherein said binary mixture is a polycarbonate/liquid crystal polymer mixture and said third polymer is a polyester.

17. The process of claim 16, wherein said polyester is polyethylene terephthalate or polybutylene terephthalate.

18. The ternary polymer blend prepared by the process of claim 12.

19. The ternary polymer blend prepared by the process of claim 16.

20. A polymer molding composition, comprising (a) 10–15 wt. % thermotropic liquid crystal polymer, (b) 90–55 wt. % polycarbonate, and (c) 10–45 wt. % polyester.

21. The molding composition of claim 20, comprising 75–90 wt. % polycarbonate.

22. A molded polymer article, prepared by molding the polymer composition of claim 1.

23. A molded polymer article, prepared by molding the polymer composition of claim 20.

24. The polymer molding composition of claim 1, consisting essentially of said thermotropic liquid crystal polymer, said polycarbonate and said polyester.

25. The polymer molding composition of claim 20, consisting essentially of said thermotropic liquid crystal polymer, said polycarbonate and said polyester.

* * * * *